United States Patent

Wilhelm

[15] 3,646,440

[45] Feb. 29, 1972

[54] TRIMMABLE PULSE CURRENT-VIEWING SHUNT

[72] Inventor: Francis A. Wilhelm, 8728 Edgehill Drive S.E., Huntsville, Ala. 35802

[22] Filed: May 4, 1970

[21] Appl. No.: 34,289

[52] U.S. Cl. ................................. 324/126, 324/95
[51] Int. Cl. .................................. G01r 1/20, G01r 21/04
[58] Field of Search ............................ 324/126, 95

[56] References Cited

UNITED STATES PATENTS

| 3,260,939 | 7/1966 | Harvey | 324/126 |
| 2,634,307 | 4/1953 | Kerns | 324/126 X |
| 2,640,092 | 5/1953 | Fett et al. | 324/126 X |
| 2,642,513 | 6/1953 | Smith | 324/126 X |

FOREIGN PATENTS OR APPLICATIONS 1,173,530  12/1969  Great Britain ..................... 324/126

Primary Examiner—Rudolph V. Rolinec
Assistant Examiner—Ernest F. Karlsen
Attorney—Harry M. Saragovitz, Edward J. Kelly, Herbert Berl and Harold W. Hilton

[57] ABSTRACT

An externally trimmable pulse current-viewing shunt for measuring high peak, fast rising current pulses. The shunt is a tubular, noninductive, four terminal resistance standard. A measurement voltage drop is developed across a thin tubular section of the shunt outer shell. An insulated inner sleeve is connected across the measurement section for coaxial coupling of instantaneous voltages to low-voltage monitor stations, for indicating the precise high-current passing through the measurement section. Precision measurements are additionally afforded by adjusting a slider on the measurement section.

3 Claims, 3 Drawing Figures

PATENTED FEB 29 1972

3,646,440

Francis A. Wilhelm,
INVENTOR

Harry M. Saragovitz
BY Edward J. Kelly
Herbert Berl &
Harold W. Hilton

TRIMMABLE PULSE CURRENT-VIEWING SHUNT

DEDICATORY CLAUSE

The invention described herein may be manufactured, used, and licensed by or for the Government for governmental purposes without the payment to me of any royalty thereon.

BACKGROUND OF THE INVENTION

Current viewing, noninductive shunts are used where it is necessary to record or measure the characteristics of large current surges or high peak current pulses such as occur in lightning measurement and radar or laser applications. Basic requirements for a surge current measuring shunt include having very low self-inductance and minimum inductive coupling between the current input circuit and the voltage measuring circuit. The voltage measurement is made by monitoring the voltage drop across a section of the current carrying circuit. For a 5,000 ampere shunt, a typical direct current resistance of about one milliohm produces a 5 volt signal. When subjected to a 5,000 ampere pulse with a rise time of one microsecond, a 1/10th microhenry inductance generates about 500 volts thereacross. Therefore, the shunt must be essentially noninductive for accuracy of measurement and relatively low-voltage coupling to monitor equipment. Additionally, the insertion resistance, across which the voltage measurement is made, should be small compared to total circuit resistance. The current carrying circuitry should have insignificant temperature variation during operation.

Conventional tubular shunts use a high resistance material in the center of the tubular structure for the voltage dropping measurement section and a low resistance metal for the remainder of the tube assembly. The measurement section resistance varies with temperature in consecutive pulse type operation, providing erroneous results. The measurement resistance drifts with age, requiring external compensation or periodic replacement of the shunt.

SUMMARY OF THE INVENTION

A trimmable current-viewing shunt is a unique resistance standard for measuring the characteristics of large current surges and high peak current pulses. The shunt is of tubular construction wherein the measuring section thereof is part of the outer shell of the tube. Having an external measuring section allows the temperature thereof to be readily controlled and measured. An upper limit of resistance is obtainable for the measurement section by trimming the section on a lathe. Thus, a precise, specified value of higher resistance can be initially machined into the outer cylindrical measurement section of the tube or can be changed to a higher value, as required, by additional trimming. A precise lower value is selectable by a slider in the measurement section.

An object of the present invention is to provide a nonmagnetic, current-viewing shunt having a tubular external measuring section.

Another object of the present invention is to provide a precise, correctable current-viewing shunt having a relatively drift free, resistive measurement section.

DESCRIPTION OF THE PREFERRED EMBODIMENT

Figure 1:
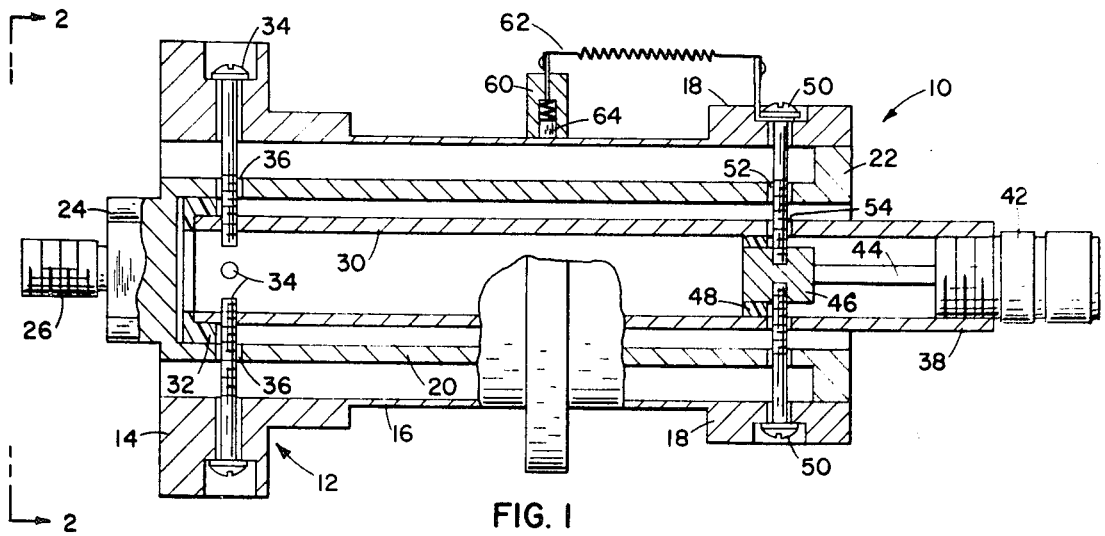
FIG. 1 is a preferred embodiment of a pulse current-viewing shunt shown partially in section.
Figure 2:
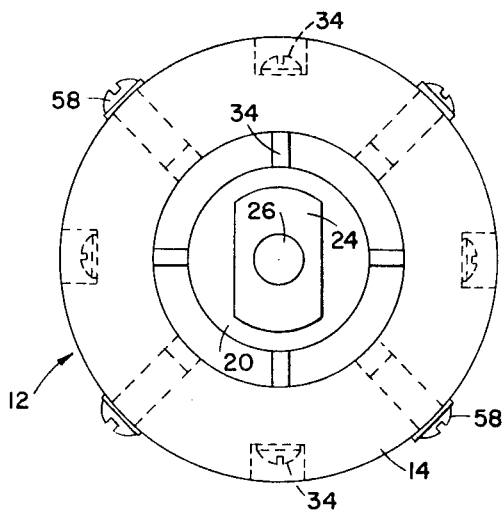
FIG. 2 is a view along the lines 2—2 of FIG. 1.

Referring now to the drawings, like numerals represent like parts in the several figures. FIGS. 1 and 2 disclose a current-viewing shunt structure 10 having a tubular outer shell 12. Shell 12 includes a base flange 14, a thin central section 16 where the measurement voltage drop is developed and an upper flange 18. An inner tubular cylinder 20 is adjacent the surface of shell 12. A flange portion 22 at one end of cylinder 20 is joined, as by welding, to support structure 18 of tube 12 forming a continuous electrical circuit therebetween. Cylinder 20 is otherwise insulated from the inner surface of shell 12 throughout the length thereof, the surfaces being held in spaced apart relationship by the connection between flange 22 and the inner surface of flange 18. Projecting beyond the periphery of base 14, the other end of cylinder 20 has a wrench 24 thereon with a threaded stud 26 projecting from the wrench. Stud 26 lies substantially along the longitudinal center line of shunt 10 with cylinder 20 and shell 12 coaxial therewith. An inner cylindrical sleeve 30 lies adjacent the inner wall of cylinder 20 and is insulated therefrom. A ring 32 supports and insulates sleeve 30 from the base of cylinder 20 and wrench 24. Sleeve 30 is electrically connected by screws 34 to base 14, with the screws passing through and being insulated from quadrature holes 36 around the circumference of cylinder 20. Inner sleeve 30 projects beyond flange 22, having a threaded end 38 thereof joined to the external threaded surface of a coaxial connector 42. A conductor 44 within sleeve 30 terminates at one end to the coaxial connector inner terminus and at the other end in a conductive support 46. Support 46 is insulated from sleeve 30 by an insulating ring 48. Support 46 is electrically connected by screws 50 to shell flange 18. Four screws 50 are arranged at equal intervals around the circumference of flange 18 and project through respective holes 52 and 54 around the circumferences of cylinder 20 and shell 30.

External power connections to the shunt are provided by stud 26 and screws 58 (FIG. 2). Screws 58 are evenly spaced apart and between screws 34 around the circumference of base 14. Low-voltage measurement connections are through coaxial connector 42. A slider 60 encompasses measurement section 16 of shell 12 and is connected by a flexible conductor 62 to screw 50. Slider 60 includes a series of contacts 64 or a conductive ring around the inner surface thereof that contact the surface of measurement section 16 around the circumference thereof and can be moved longitudinally along the tube to increase or decrease the measurement shunt resistance bridged by the coaxial connector. Slider conductor 62 can be connected at either end of measurement section 16 for varying the shunt measurement resistance.

Figure 3:
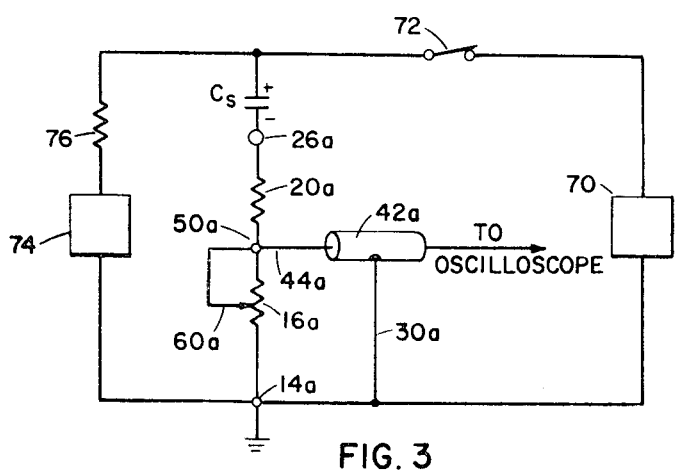
FIG. 3 is a typical electrical circuit diagram of the current-viewing shunt.

In FIG. 3, a typical electrical circuit employing the inventive concept is shown. Electrical components of FIG. 3 that correspond to numbered parts of FIG. 1 have the same number with the supplementary letter "a" therewith. Hence, base 14 is connected as 14a to the grounded side of a high current load 70 and stud 26a is connected to the low (negative) side of a storage capacitor $S_s$. The positive side of $C_s$ is connected to the other side of load 70 through a switch 72. A power supply 74 is grounded to base 14a on one side and has the other side connected through a charging resistance 76 to the positive side of $C_s$ for supplying the periodic charging potential thereto. Coaxial cable 42a is connected to a high impedance load, such as an oscilloscope, oscillograph or other monitor equipment (not shown). The outer conductor of coax 42a connects through conductive sleeve 30a (and screw 34) to the shunt common 14a. The inner conductor of coax 42a connects through probe 44a to the common junction 50a of low resistances 16a and 20a and to one side of slider arm 60a. The other side of resistance 20a connects to stud 26a and the other side of resistance 16a connects to common ground 14a. Slider 60a is adjustable along the length of resistance 16a, functioning as a slidewire resistor to vary the resistive load terminated across coax 42a.

Capacitor $C_s$ is periodically charged to a preselected potential by power supply 74. Load 70 presents an open circuit until the potential across $C_s$ reaches the breakdown potential of the load or until supplemental stimulation of the load reduces the breakdown potential, initiating current flow therethrough and reducing the load impedance to a negligible value. At breakdown of the load impedance, load 70 becomes an effective short circuit and $C_s$ discharges through the very low resistances 20a, 16a and the load. Current flow through the load terminates when the load circuit can no longer sustain conduction or when $C_s$ has discharged to the point where recharging begins. The instantaneous voltage drop generated across the measurement section, resistance 16a and slider 60a, is coupled through coax 42a to measuring equipment during capacitor discharge.

For a laser load 70, external stimulation of the laser can be periodically supplied to initiate laser pumping when $C_s$ has reached a preselected charge potential, allowing $C_s$ to discharge through the lasing medium. Similarly, switch 72 can be switched on and off to periodically place $C_s$ across load 70. In measuring current across a gap load, external stimulation may be employed by placing a potential on a third probe or starter electrode. With either type of load, impedance breakdown can occur with only the potential of $C_s$ across the load. The current viewing shunt places a negligible resistance in series with the load allowing the current pulse discharged therethrough to be measured repeatedly with very little change in the measuring resistance due to heat build up or aging. The resistance of sleeve 30 is negligible and is immaterial because of the high input resistance of the monitor equipment.

The discharge surge from energy storage bank $C_s$ flows through cylinder 20 and shell 12 to the external circuit. Since these two outer, current carrying tubes are concentric with reverse flowing currents on adjacent tubes, the net effective flux cutting the outer shell approaches zero. Similarly, the viewing or measured output through sleeve 30 and conductor 44 is also in a minimum flux field. Hence, the displayed or monitored pulse is essentially a calibrated plot of the instantaneous current in the discharge circuit. A nonmagnetic, stainless steel, metal is used in constructing the cylindrical elements 12, 20 and 30 providing an easily machinable corrosion resistant shunt. The voltage drop tube, measuring section, is on the outer surface allowing a precise specified value of higher resistance to be obtained by trimming on a lathe. The temperature of the external section is easily measurable and can be readily controlled. Thus, an unknown pulse of high current energy can be accurately and safely measured and a known peak current can be observed to maintain repetitive accuracy.

Increasing the resistance of wall 16 can be accomplished by trimming in a lathe to reduce the wall thickness or by increasing the length of cut for wall section 16. An alternate readout from the adjustable slider can employ a series of slits in the current carrying members 16 and 20 to allow friction contacts from the slider to contact inner sleeve 30. The stud configuration at the wrench end of cylinder 20 is for use with capacitors having threaded holes for bolt connection. Obviously, the wrench end of cylinder 20 can be adapted or constructed for different types of capacitor terminals.

Although a particular embodiment and form of this invention has been illustrated, it is apparent that various modifications and embodiments of the invention may be made by those skilled in the art without departing from the scope and spirit of the foregoing disclosure. Accordingly, the scope of the invention should be limited only by the claims appended hereto.

I claim:

1. A current-viewing shunt for measuring high peak current pulses comprising: first and second series connected resistances, a coaxial connector for coupling measurement voltages from said resistances, conductive means having one end connected to a common point between said resistances and the other end connected at the inner terminus to said connector, a conductor connected between the shield conductor of said coaxial connector and the other end of said first resistance, first and second terminals connected to the other ends of said first and second resistances respectively for serially passing a high current therethrough, a first tubular metal cylinder having a grooved annular ring portion between upper and base ends thereof, said annular ring being said first resistance, said second resistance being a second cylinder of nonmagnetic metal and being coaxially encompassed by said first resistive cylinder, having a flange at one end thereof joined to said upper end of said first cylinder for providing said series connection therebetween, said second cylinder being closed at the other end thereof and having a wrench and stud portion extending outwardly therefrom substantially along said common axis, said stud being said second terminal, said conductor being a conductive sleeve of nonmagnetic metal within said second cylinder and coaxial with said cylinders, said sleeve having a threaded end projecting external to said flanged end of the second cylinder, insulating support means adjacent the inner surface and closed end of said second cylinder for encompassing the other end of said sleeve, an insulating support ring joined to the inner wall of said sleeve adjacent said threaded end thereof, a conductive rod supported by said support ring and having one end thereof forming the inner terminus of said coaxial connector, said first or outermost cylinder having a plurality of common electrical terminals around the circumference of said base end for providing said first terminal, and at least one of said base terminals being radially connected to said sleeve through an opening in said second cylinder wall for connecting said conductive sleeve to the other end of said first resistance.

2. A current viewing shunt as set forth in claim 1 wherein said first cylinder has a plurality of electrical terminals around the circumference of said upper end, said terminals being in common and radially connected to said conductive rod through openings in said second and third cylinder wall for providing said conductive means to said resistance common point.

3. A current viewing shunt as set forth in claim 2 wherein said grooved annular ring has a uniform cylinder wall thickness between said flanges for providing a uniform resistance distribution therealong; and further comprising a sliding contact means encompassing a portion of said annular ring, said slider having a series of electrical contacts therein contacting the external surface of said annular ring in a plane normal thereto and a flexible electrical conductor connecting said slider to said upper end terminals for varying the resistance terminated across said coaxial connector.

* * * * *